(12) United States Patent  
Cesarano, III et al.

(10) Patent No.: US 9,597,837 B1  
(45) Date of Patent: Mar. 21, 2017

(54) METHOD FOR MAKING A FLUIDIC DEVICE

(71) Applicant: Robocasting Enterprises, Albuquerque, NM (US)

(72) Inventors: Joseph Cesarano, III, Albuquerque, NM (US); John Nicholas Stuecker, Albuquerque, NM (US)

(73) Assignee: Robocasting Enterprises, LLC, Albuquerque, NM (US)

( * ) Notice: Subject to any disclaimer, the term of this patent is extended or adjusted under 35 U.S.C. 154(b) by 149 days.

(21) Appl. No.: 14/629,072

(22) Filed: Feb. 23, 2015

Related U.S. Application Data

(60) Division of application No. 13/844,624, filed on Mar. 15, 2013, now abandoned, which is a (Continued)

(51) Int. Cl.  
*B29C 41/02* (2006.01)  
*B29C 67/00* (2006.01)  
(Continued)

(52) U.S. Cl.  
CPC .......... *B29C 67/0081* (2013.01); *B28B 1/001* (2013.01); *B29C 67/0055* (2013.01);  
(Continued)

(58) Field of Classification Search  
CPC . B29C 41/02; B29C 67/0051; B29C 67/0055; B29C 67/0059; B29C 67/0062; B29C 67/0066; B29C 67/007; B29C 67/0074; B29C 67/0077; B29C 67/0081; B29C 67/0085; B29C 67/0088;  
(Continued)

(56) References Cited

U.S. PATENT DOCUMENTS 5,997,795 A * 12/1999 Danforth ............. B29C 67/0062  
264/308 X  
6,454,811 B1 * 9/2002 Sherwood ........... B29C 67/0081  
623/23.72  
(Continued)

OTHER PUBLICATIONS

Ferrizz et al, "Monolithic Supports with Unique Geometries and Enhanced Mass Transfer", Ind. Eng. Chem. Res., vol. 44, pp. 302-308 (2005).*

*Primary Examiner* — Leo B Tentoni  
(74) *Attorney, Agent, or Firm* — Peacock Myers, P.C.; Janeen Vilven

(57) ABSTRACT

A fluidic device comprising a first region within the wall of the fluidic device comprising a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed; and a second region comprising one or more channels formed within the wall of the device wherein the second region is positioned at the fluidic inlet side, the fluidic outlet side or both.

21 Claims, 15 Drawing Sheets

Related U.S. Application Data continuation-in-part of application No. 12/272,774, filed on Nov. 17, 2008, now abandoned.

(60) Provisional application No. 60/988,198, filed on Nov. 15, 2007.

(51) Int. Cl.
| | | |
|---|---|---|
| *B28B 1/00* | (2006.01) | |
| *C04B 38/00* | (2006.01) | |
| *B29D 99/00* | (2010.01) | |
| *B33Y 10/00* | (2015.01) | |
| *B33Y 80/00* | (2015.01) | |

(52) U.S. Cl.
CPC ...... *B29C 67/0059* (2013.01); *B29C 67/0088* (2013.01); *B29D 99/0089* (2013.01); *C04B 38/0006* (2013.01); *B33Y 10/00* (2014.12); *B33Y 80/00* (2014.12)

(58) Field of Classification Search
CPC ............ B29C 67/0092; B29C 67/0096; B29D 99/0089; C04B 38/0006
USPC .......................... 264/129, 308; 700/118, 119
See application file for complete search history.

(56) References Cited

U.S. PATENT DOCUMENTS

| | | | |
|---|---|---|---|
| 6,623,687 B1* | 9/2003 | Gervasi ............... | B29C 67/0066 264/308 |
| 6,993,406 B1* | 1/2006 | Cesarano, III ............ | A61F 2/28 700/118 X |
| 7,527,671 B1* | 5/2009 | Stuecker ............ | B01D 39/2086 264/308 |
| 2005/0039885 A1* | 2/2005 | Vaidyanathan ........... | F28F 7/02 165/80.4 |

* cited by examiner

Lattice with radiating struts
Submerged flame gets trapped at interface between lattices
Gas preheat/mix lattice

METHOD FOR MAKING A FLUIDIC DEVICE

CROSS-REFERENCE TO RELATED APPLICATIONS

This application is a Divisional Application of U.S. patent application Ser. No. 13/844,624, entitled "Fluidic Devices and Methods for Making", filed on Mar. 15, 2013, now abandoned, which is a Continuation-In-Part of U.S. patent application Ser. No. 12/272,774, entitled "Fluidic Devices and Methods For Making", filed Nov. 17, 2008, now abandoned, which claims priority to and the benefit of U.S. Provisional Patent Application No. 60/988,198, entitled "Lattices Which Modify Turbulence And Improve Fluid Flow", filed on Nov. 15, 2007, and the specification and claims thereof are incorporated herein by reference.

STATEMENT REGARDING FEDERALLY SPONSORED RESEARCH OR DEVELOPMENT

Not Applicable.

INTRODUCTION

Periodic three-dimensional lattice structures are useful in static environments as piezo-electric devices[1], optical photonic bandgap filters[2], and bone scaffolds[3]. They also have use in devices to induce turbulence into a flowing fluid, leading to a benefit of increased mass transfer of the fluid traveling through the structure. In some applications, performance may be improved if zones of different turbulence are combined or if a zone of reduced turbulence is introduced upon exit.

SUMMARY OF THE INVENTION

Embodiments of the present invention provides a method for making a three-dimensional porous fluidic device comprising depositing struts and or walls in the three-dimensional geometry using a rapid-prototyping method such as robocasting or 3-D printing to create a monolithic structure with varying geometry to produce user controlled flow behavior of the fluid within a porous fluidic device. All structural features of the 3-dimensional porous fluidic device are formed monolithically at one time. Purposeful variation of the structure within the porous fluidic device produces at least a first region and a second region which regions are structurally different and produce user controlled flow behavior of the fluid.

An embodiment of the present invention provides for a fluidic device having a first region within the wall of the fluidic device comprising a lattice of a plurality of struts positioned in layers forming a network of pores. The struts in the first layer are separated from the struts in a third layer by struts in a second layer which are arranged at an angle to the struts in the first layer and the third layer. The struts in the third layer and the first layer are offset in spacing and wherein the struts within a layer are separated from an adjacent strut within the layer by a space such that channels having a tortuous pathway of interconnecting pores is formed and a second region comprising one or more channels formed within the wall of the device. A second region is positioned adjacent to the first region and is structurally different from the first region.

In a preferred embodiment, the second region contains a single channel formed by the wall of the device extending past the first region and wherein there are no struts positioned in the second region.

In a more preferred embodiment, the second region contains a plurality of channels formed from a plurality of layers of struts stacked in a row to form a plurality of walls such that the one or more channels are columnar to reduce tortuosity and promote a more laminar flow. For example the walls or a portion thereof may be porous or non-porous or a combination thereof.

In a more preferred embodiment, the second region contains a plurality of channels formed from a plurality of layers of struts layered such that a first layer of struts is separated from a third layer of struts by a second layer of struts positioned at an angle to the first and third layer of struts and wherein the struts in the first layer and the second layer are aligned with respect to each other such that a columnar channel is formed to reduce tortuosity and promote a more laminar flow.

In the rapid prototyping method such as robocasting, the monolithic structure is made by depositing a slurry, ink, or paste. For example the slurry may contain a catalyst for reacting with a fluid to be passed through the fluidic device or the fluidic device is coated with a catalyst for facilitating a reaction within one or more fluids or a mixture of one or more fluids and a solid. The slurry may comprise particles and a solvent wherein the particles are selected from a ceramic, a metal, a glass, a polymer, an organic, or any combination thereof. For example the particles may be latex but not limited thereto. The solvent may be a volatile solvent. The spacing between struts within a layer can be uniform within a layer or varied.

The method may further comprise designing a three-dimensional geometry of a porous fluidic device utilizing software implemented by a computer. Additionally, the software is selected from the group consisting of mass transport software and solid mechanics software to match a pre-selected property, said property selected from the group consisting of compressive modulus, compressive strength, porosity of the porous structure, tortuosity of the porous fluidic device, mass transport characteristics, and thermal transport characteristics of the porous fluidic device.

Another embodiment provides for a fluidic device comprising a first region within the wall of the fluidic device comprising a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed and a second region comprising one or more channels formed within the wall of the device wherein the second region is positioned at the fluidic inlet side, the fluidic outlet side or both.

In a preferred embodiment, the second region contains a single channel formed by the wall of the device extending past the first region and wherein there are no struts positioned in the second region.

In a more preferred embodiment, the second region contains a plurality of channels formed from a plurality of layers of struts stacked in a row to form a plurality of walls such that the one or more channels are columnar and promotes a laminar flow. For example the walls or a portion thereof may be porous or non-porous or a combination thereof.

In a more preferred embodiment, the second region contains a plurality of channels formed from a plurality of layers of struts layered such that a first layer of struts is separated from a third layer of struts by a second layer of struts positioned at an angle to the first and third layer of struts and wherein the struts in the first layer and the second layer are aligned with respect to each other such that a columnar channel is formed to promote a more laminar flow.

It is an aspect of the present invention to provide lattice structures to establish engineered flow to a stream of dynamic matter by altering the turbulence of the matter interacting with the structure of the fluidic device.

It is an aspect of the present invention to improve mass transfer of matter in the fluid to the surfaces of the porous fluidic device.

It is another aspect of the present invention to provide an improved fluidic device having zones of varied flow characteristics for examples turbulence, mass transfer, thermal transfer velocity contained within the structure.

Additional aspects of the present invention will be apparent in the following detailed description read in conjunction with the accompanying drawing figures.

BRIEF DESCRIPTION OF THE DRAWINGS

Further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

The file of this patent contains at least one drawing executed in color. Copies of this patent with color drawing (s) will be provided by the Patent and Trademark Office upon request and payment of the necessary fee.

DETAILED DESCRIPTION OF THE INVENTION

As used herein "a" means one or more unless otherwise indicated.

As used herein "about" or "approximately" means within twenty percent (20%) of the numerical amount cited.

Figure 1A:
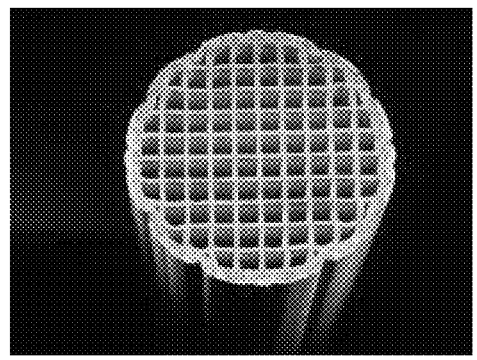
FIGS. 1A and 1B illustrate fluidic devices with different structures through which fluid passes.
Figure 1B:
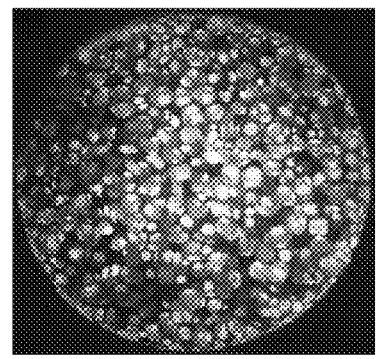
Figure 2A:
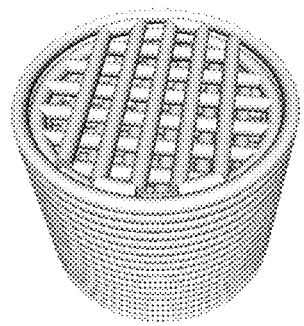
FIGS. 2A, 2B and 2C illustrate a periodic 3-dimensional lattice with offset struts in a perspective view, axial cross section view and results from a computer model simulating the flow of a methane-containing gas through a lattice.
Figure 2B:
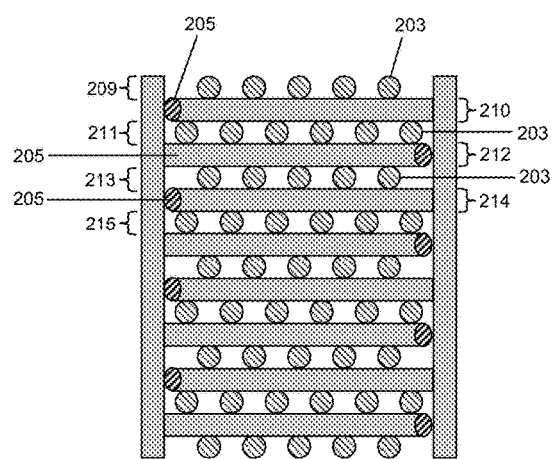

FIGS. 1 and 2 illustrate fluidic devices displaying geometries through which fluid passes. FIG. 1 illustrates an extruded honeycomb structure exhibiting straight through channels. The honeycomb structure is open at the inlet and the outlet but solid along the walls forming each channel. The adjacent straight through channels lead to laminar flow of a fluid passing there through. As a result there is low turbulence of the fluid and poor mass transfer as fluid enters the inlet and exits the outlet (not shown). This structure is not ideal for applications where fluids (gases or liquids) flowing through the structure need to interact vigorously with the structure itself. The reticulated foam structure shown in FIG. 1B is an alternative structure that leads to an increase in mass transfer within the structure by creating tortuous random pathways through which the fluid flows after entering the inlet and exits the outlet (not shown). The method and materials by which the foams are created leads to variability in the pattern of the porous structure and thus undesired variability in the flow rate, low flow rate reproducibility and/or pressure drop through the structure.

A fluidic device with a periodic lattice structure and non-random geometry is illustrated in FIG. 2. This structure can induce turbulence and high mass transfer with a lattice of offset struts thereby allowing channel to channel interconnectivity through tortuous pathways in the non-random geometry of the structure[4,5]. Computer-controlled layered manufacturing of a fluidic device is one possible method to create such periodic lattice structures where no straight-through channels exist that connect the inlet with the outlet of the fluidic device[6,7,8,9]. A cross-sectional view of a periodic lattice geometry is shown in FIG. 2A.

Referring now to FIG. 2A, a perspective view of a device with interconnected porosity formed with a lattice of offset struts is illustrated. Panel B illustrates a cross sectional view device with interconnected porosity formed with a lattice of offset struts. In this illustration each of the circles represents a strut 203 which is positioned in every other layer 209, 211, 213, 215 of the structure with strut 205 positioned at layers 210, 212 and 214. Struts 205 within a layer are separated thereby creating voids into which fluid flows after being split at struts 203. The fluid interacts with the material from which the structure of the fluidic device is composed thereby increasing turbulence and mass transfer, an improvement over extruded honeycomb structures of a similar surface area. The engineered periodic lattice pattern of the fluidic device is reproducible and therefore has much less flow-rate variability than reticulated foams which have a random pattern. The distance between struts within a layer may be uniform or varied.

Figure 2C:
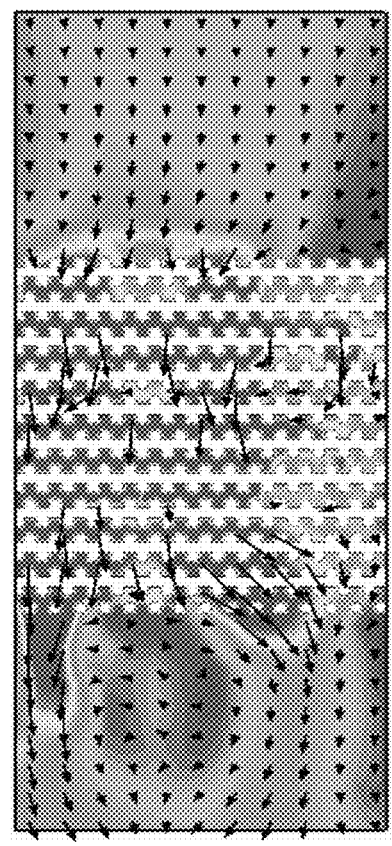

Referring now to FIG. 2C, a computer simulated model of exiting fluid from a fluidic device having the structure illustrated in FIG. 2A. The simulation illustrated that the fluid can retain non-uniform flow patterns upon exit from the device. It has been observed in water tests that this behavior can lead to extensive cavitation, stream-splitting, droplet formation, and splashing.

The fluid upon which the simulation is based is a methane-containing gas flowing through a lattice with offset struts. The methane-containing gas flows at about 205 cc/min at about 600 degrees Celsius. The vectors (arrows) represent variations in the direction of flow and the colors represent variation in velocity. Light blue colors represent regions with very low velocity. Orange and red regions have velocity approximately 10 times greater than the light blue regions. When the vectors are parallel there is very little turbulence as shown on the inlet side of the lattice. As the fluid travels through the lattice the flow is forced to interact with the offset struts and change direction and velocity. These disruptions increase turbulence and dramatically increase mass transfer and interaction between matter in the flowing fluid and the surfaces of the lattice. For this reason, fluidic devices of the present invention provide improved utility for catalyst supports and filters.

Figures 3A, 3B:
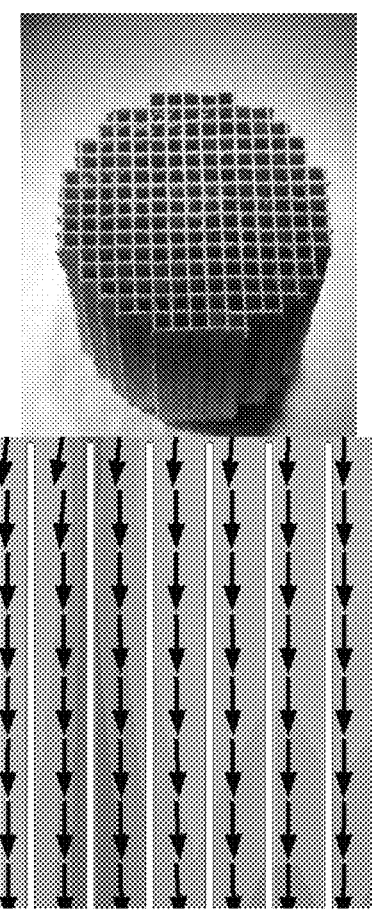
FIGS. 3A, 3B, 3C and 3D illustrate a honeycomb fluidic device, and the corresponding computer model simulating the flow of a methane-containing gas through the structure and a porous fluidic device with interconnecting porosity and the corresponding computer model simulating the flow of a methane-containing gas through the structure.
Figure 3C:
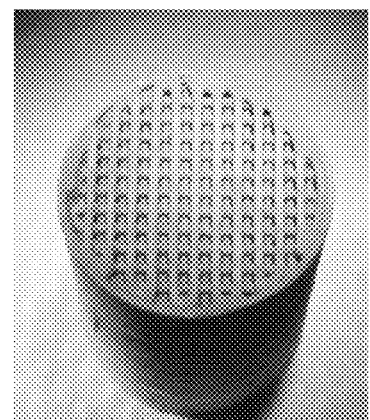
Figure 3D:
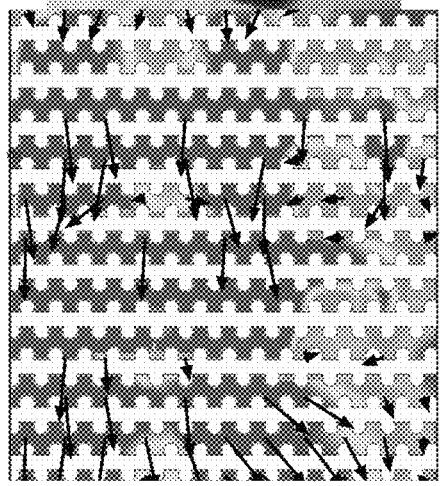

To further illustrate the behavior of lattices with offset struts, a comparison is made in FIGS. 3A and 3C between fluid flow through a traditional honeycomb fluidic device and a fluidic device having offset struts. Using the same simulation for hot methane-containing gas, FIG. 3B shows a much more laminar and uniform flow of the fluid through the honeycomb structure of FIG. 3A in comparison to a simulation for hot methane-containing gas in FIG. 3D flowing through a fluidic device having a structure with lattice of offset struts as depicted in FIG. 3C. The vectors represent variations in the direction of flow and the colors represent variation in velocity. The path of fluid flow in FIG. 3D illustrates a greater degree of velocity variation and changes in the flow patter as compared to the fluid flow in FIG. 3C.

Figure 4A:
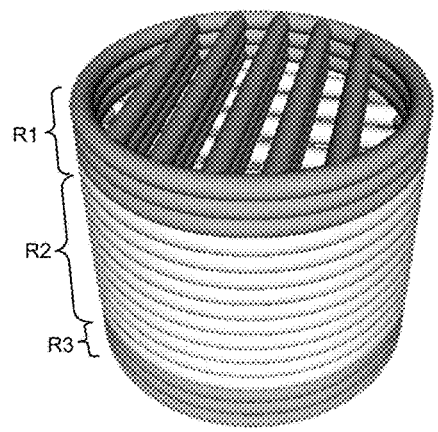
FIGS. 4A, 4B and 4C illustrate a fluidic device according to one embodiment of the present invention in a perspective view, a cross-sectional view, and an end view of region R3.
Figure 4B:
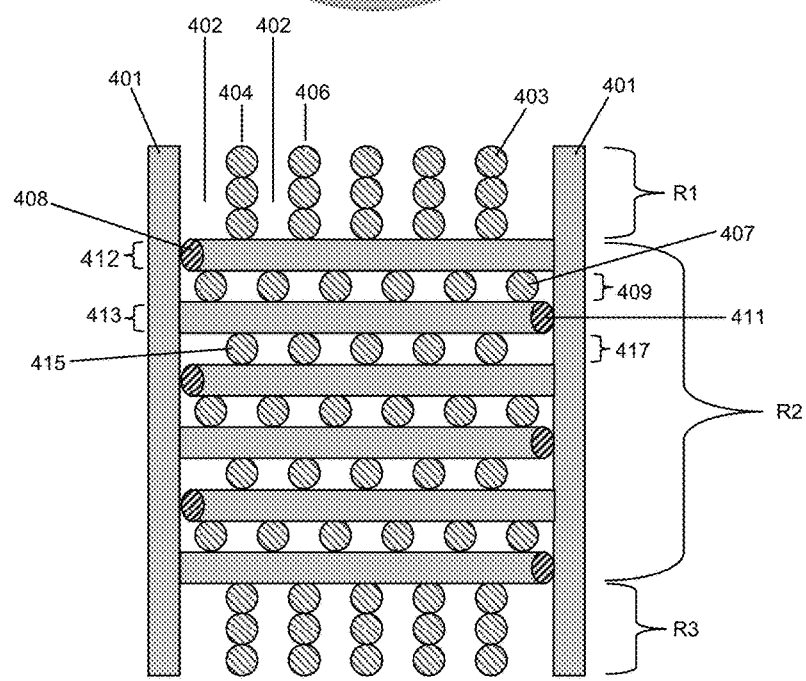

Referring now to FIG. 4, a perspective view of a monolithic fluidic device according to one embodiment of the present invention is illustrated. FIG. 4B provides a cross sectional view of a fluidic device with a lattice having offset struts within region R2 in combination with one or more channels in region R1 located above region R2 and one or more channels in region R3 located below region R2 of the periodic lattice formation. Struts 403 are layered to form solid walls 404 and 406. Wall 401 provides an outer support to the structure. A channel 402 is formed between outer wall 401 and inner wall 404 and/or inner wall 404 and inner wall 406. Fluid introduced into region R1 flows into the channels and is directed to region R2. Region R2 is formed of struts positioned in a periodic lattice wherein the struts in every other layer are offset in a periodic fashion. A strut 411 forms a third layer 413 interposed between struts 407 in a second layer 409 and struts 415 in a fourth layer 417. Struts 415 in the fourth layer 417 are offset from struts 407 in the second layer 409. Strut 408 in the first layer 412 interconnects with channels 402 and walls 404 and 406 in region R1. Further the lattice in region R2 may be repeated to create an extended R2 region within the fluidic device. While R1 and R3 are identical in geometry, in an alternative embodiment, regions R1 and R3 may be different.

Figure 4C:
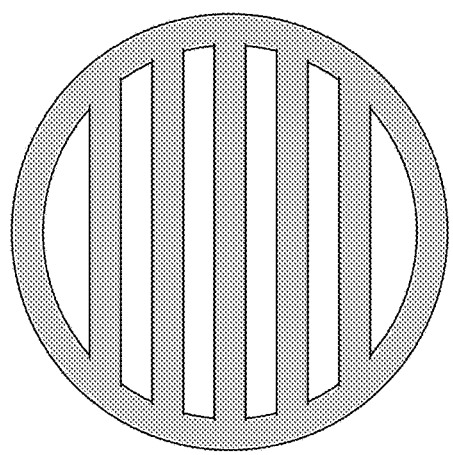
Figure 9:
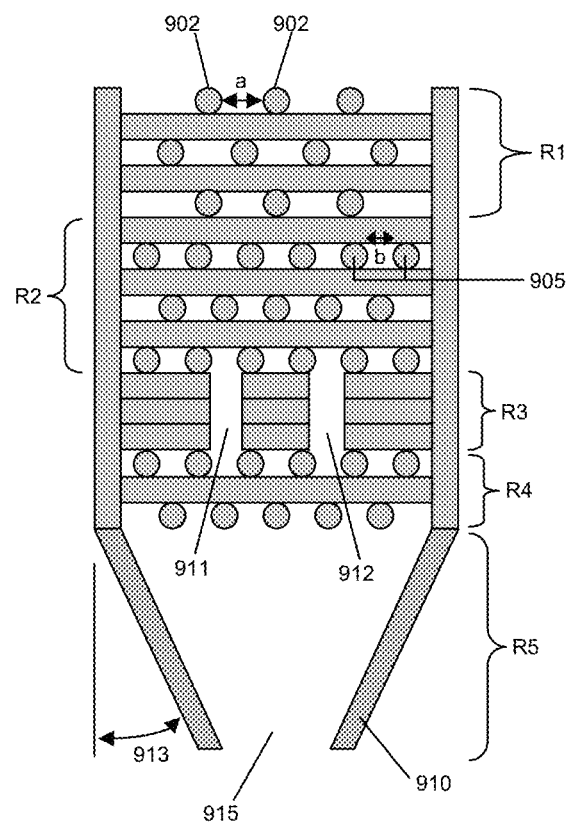
FIG. 9 illustrates a fluidic device according to one embodiment of the present invention.

Referring now to FIG. 4C, a bottom view of region R3 is illustrated. The perspective in FIG. 4C illustrates how layers of struts can be used to create walled channels on the inlet and/or outlet side of the structure. These channels reduce tortuosity, help reduce turbulence and help promote more laminar flow at the exit of the structure. The number of channels can vary from one large channel formed by the exterior walls extending past the periodic lattice to a plurality of channels. Channels are not limited to the inlet or outlet as one or more channels may be located between periodic lattice regions such as R2 when there are a plurality of these regions in sequence, for example, as illustrated in FIG. 9.

Figure 5A:
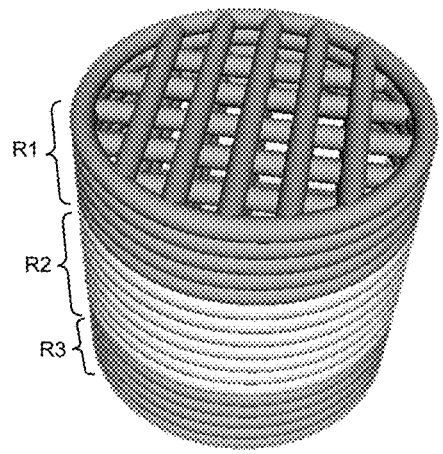
FIGS. 5A, 5B and 5C illustrate a fluidic device according to another embodiment of the present invention in a perspective view, a cross-sectional view, and an end view of region R3.
Figure 5B:
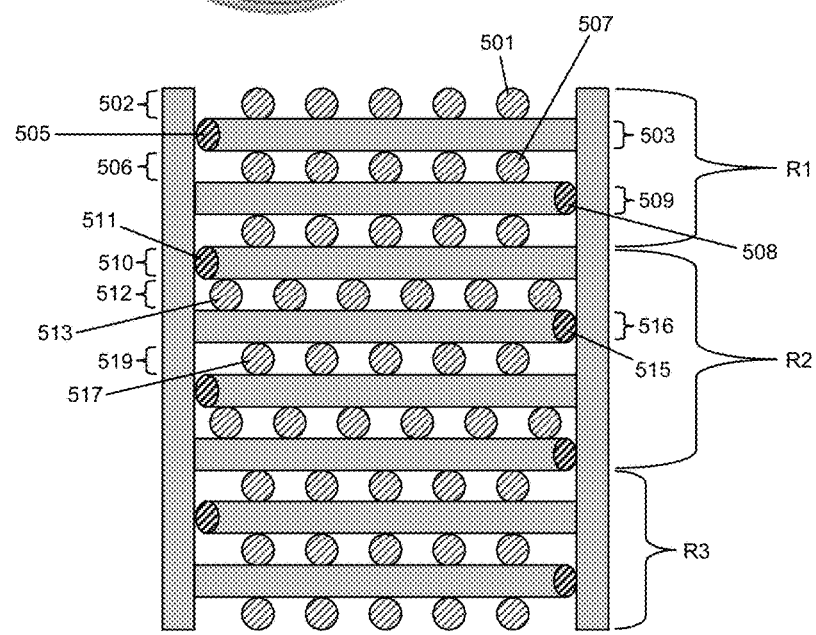
Figure 5C:
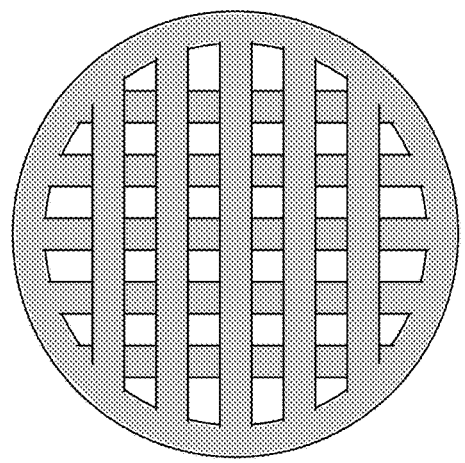
Figure 6A:
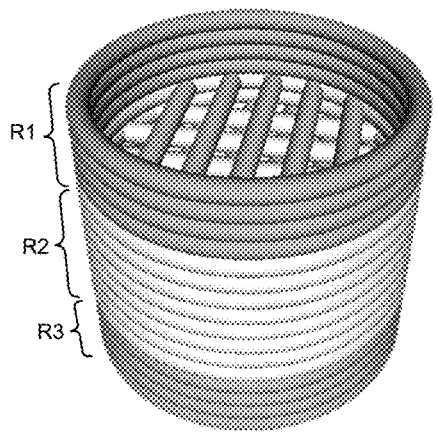
FIGS. 6A, 6B and 6C illustrate a fluidic device according to one embodiment of the present invention, a cross-sectional view, and an end view of region R3.
Figure 6B:
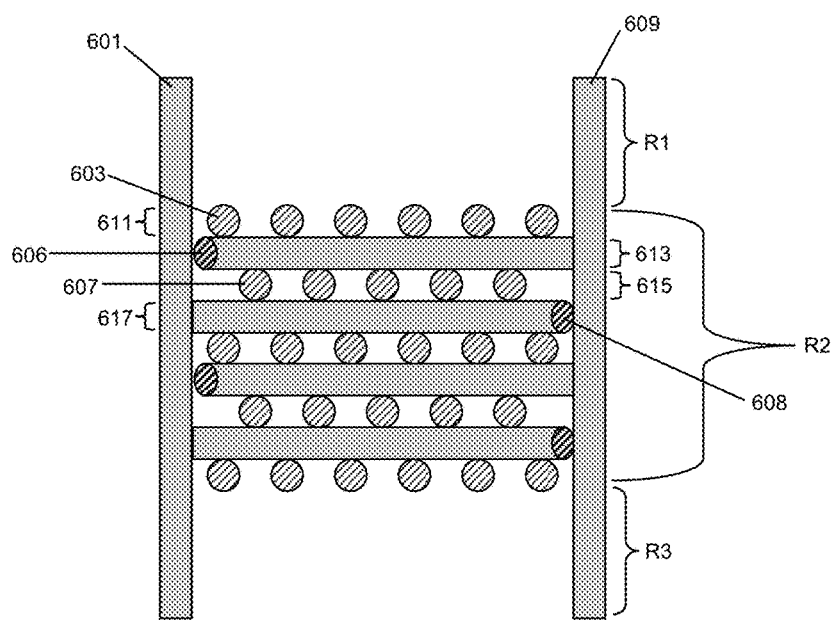

Additional inlet and outlet geometries for alternative embodiments of the present invention are illustrated in monolithic structures of FIGS. 5 and 6. Regions R1 and R3 in FIG. 5 reduce tortuosity and turbulence of dynamic matter before the matter exits the fluidic device. Referring now to FIG. 5A, a perspective view of one embodiment of the present invention is illustrated. FIG. 5B provides a cross sectional view of a fluidic device having an offset lattice located in region R2 with struts 513 forming a second layer 512 interposed between struts 511 within a first layer 510 and struts 515 within a third layer 516 wherein the struts in the first and third layer are offset with respect to each other in the region R2. Regions R1 and R3 are identical. The geometry in region R1 comprises struts 501 in the first layer 502 and struts 507 in the third layer 506 wherein the first layer and third layer are separated by struts 505 in the second layer 503 wherein struts 501 in the first layer 502 are aligned with the struts 507 in the third layer 506 and with the struts in every-other layer in region R1 such that the struts in these every-other layers are aligned in a non-offset arrangement thereby forming a plurality of channels. The arrangement of struts in region R1 forms a geometry more analogous to the extruded honeycomb, where straight-through channels do exist. However, the monolithic structure of FIG. 5 combines both regions of offset struts illustrated in region R2 and channels formed by the in-line arrangement of struts in region R1 at the boundaries of the fluidic device, allowing for a region of high tortuosity and turbulence (high mass transfer) in region R2 as well as a region with reduced tortuosity and turbulence to provide more laminar characteristics and desirable exit flow in regions R1 and R3.

Referring now to FIG. 5C, a bottom view of region R3 of the structure in FIG. 5 is illustrated. FIG. 5C shows how cross-hatched layers of struts can be used to create channels on the fluid exit-side of the structure. These channels reduce tortuosity and turbulence and help promote more laminar flow of the fluid at the exit of the structure.

Referring now to FIG. 6A, a perspective view of one embodiment of the present invention is illustrated. Panel B illustrates a cross sectional view of a fluidic device with a lattice comprising offset struts 603 and 607 in the first and third layer being separated by strut 606 in the second layer in region R2. Regions of exterior boundary R1 and R3 are formed by wall 601 and 609 extending beyond the region R2 having the interconnecting porous 3-dimensional structure of the lattice.

Figure 6C:
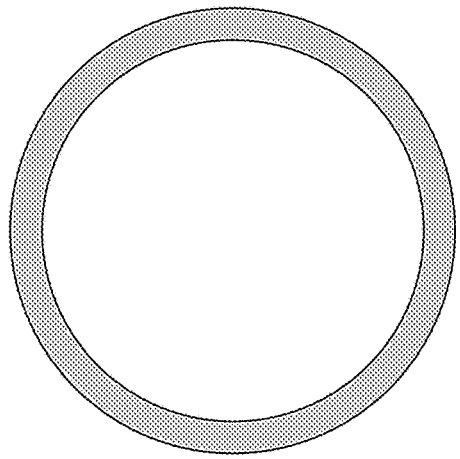

Referring now to FIG. 6C, an end view for region R1 and R3 is illustrated. This view shows how layers of material can be used to create an exterior boundary for the inlet and outlet of the fluidic structure forming a large pore. Region R1 and R3 are free of struts thereby reducing tortuosity and turbulence and promoting more laminar flow at the inlet and the outlet of the fluidic device.

Figure 7A:
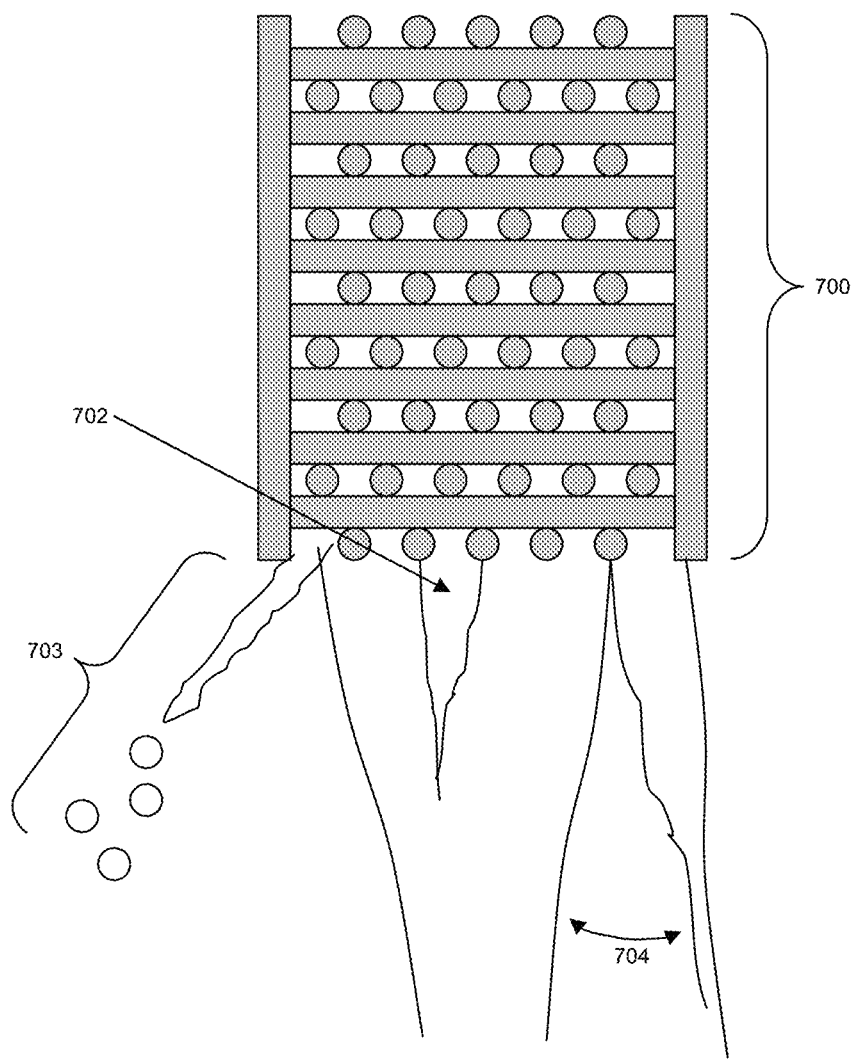
FIGS. 7A and 7B illustrate fluid flow from the outlet of a fluidic device.
Figure 7B:
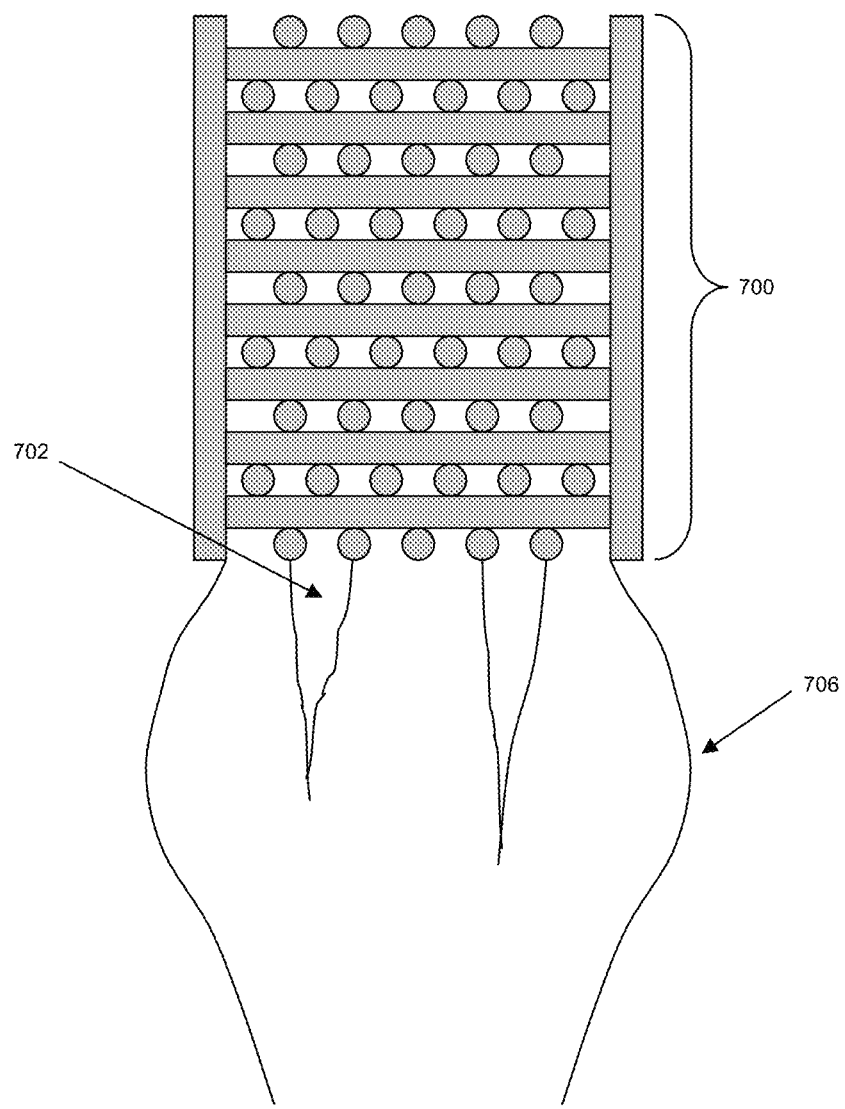

Referring now to FIG. 7A, a diagram of an exit flow from a fluidic device with a lattice having offset struts is illustrated. Turbulence can create several undesirable exit flow characteristics including droplets outside the typical flow path and splashing 703, and cavitations 702 just after the exit layer, stream splitting 704, and excessive bulging of the stream 706 as is illustrated in FIG. 7B.

Figure 8:
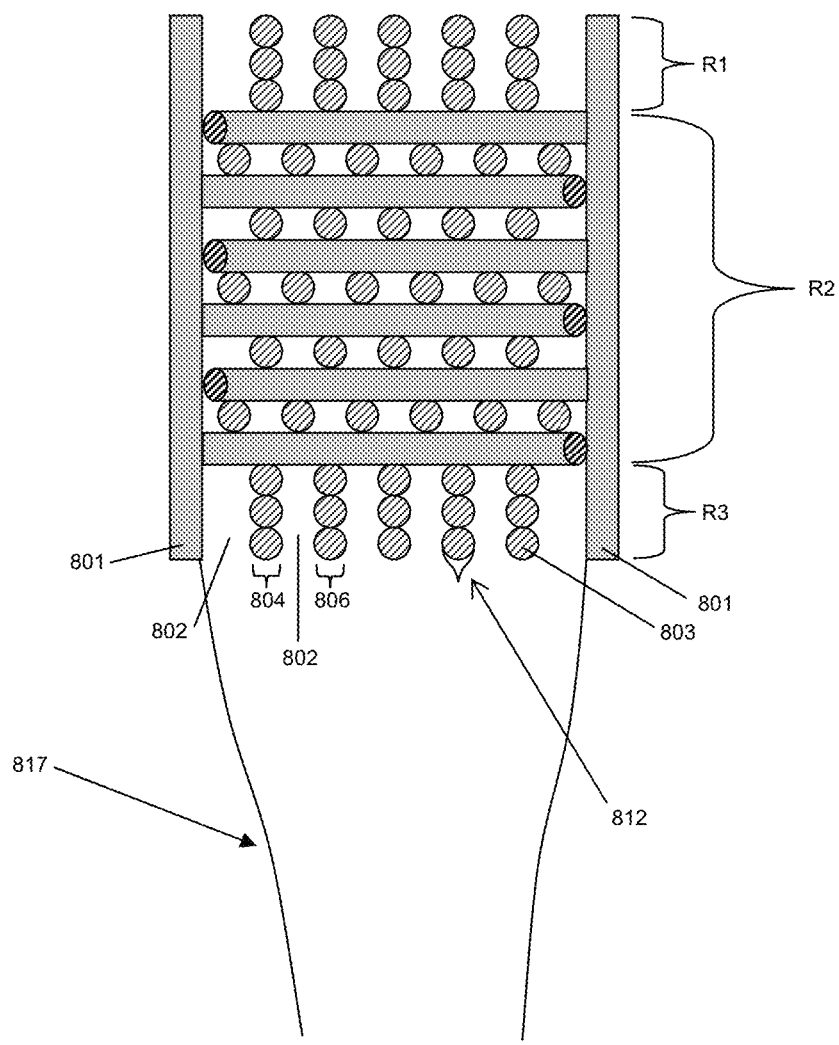
FIG. 8 illustrates fluid flow from the outlet of a fluidic device according to one embodiment of the present invention.

Referring now to FIG. 8, a diagram of fluid exiting from a monolithic fluidic device having channels in region R1 and R3 in combination with offset struts in region R2 is illustrated. Region R1 is identical to region R3. Struts 803 are layered to form a solid wall 804 and 806. Wall 801 provides an outer support to the structure. A wall may be layers of stacked struts wherein the struts can be straight, curved or a combination thereof. A channel 802 is formed between outer wall 801 and inner wall 804 or inner wall 804 and inner wall 806. Fluid introduced into region R1 flows into the channels and is directed to region R2. In region R3 the channels positioned therein may reduce turbulence prior to exit, reduce cavitations 812 and/or produce a more uniform tapered stream 817.

Furthermore, monolithic fluidic devices having a first lattice region with offset struts modified in sequence with regions of other lattices with offset struts can be used to adjust tortuosity and turbulence to modify, enhance, or improve filtration, catalytic reactions, thermal transfer, noise suppression of exhaust steams, mixing of multiple materials, or the creation of controlled combustion zones, for example.

Referring now to FIG. 9, a monolithic fluidic device according to one embodiment of the present invention is illustrated having different lattices of offset struts in sequence with a region of constricting holes which force material near the center of the device before transitioning into another lattice with offset struts. Region R1 provides an offset strut arrangement wherein the spacing between the struts 902 in the same layer have a distance of "a". Region R2 comprises struts 905 wherein the spacing between the struts 905 have a distance "b" wherein the distance measured for "a" is greater than the distance measure for "b". However in another embodiment the spacing at "a" may be less than the spacing at "b". However in another embodiment the spacing a "b" is less than the spacing at "a". Region R3 comprises channel 911 that is not interconnected with an adjacent channel 912. Region R3 connects with region R4 which is another region with off set struts similar to region R2. Region R4 connects to region R5 which provides tapering 913 of walls 910 to create an empty tapered exit region 915 for the fluid to exit from the fluidic device.

Several applications can be envisioned for fluids, mixtures of fluids, or combinations of fluids and solids which require engineered flow control in dynamic environments.

Figure 10A:
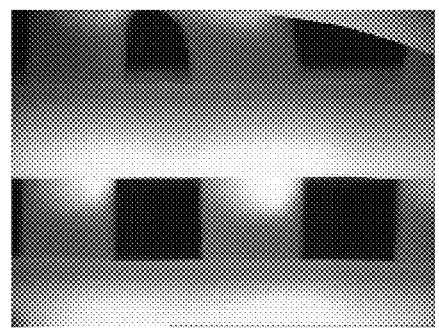
FIGS. 10A and 10B illustrate magnified views of struts.
Figure 10B:
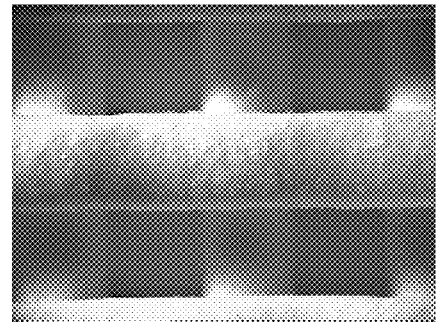

It should also be understood that the struts may be of any cross-section, not just circular as depicted in the figures above. Furthermore, the struts can be modified to have roughened surfaces as illustrated in FIG. 10. Surface roughness can affect filtration efficiency, reaction kinetics, thermal transfer, etc. Referring now to FIG. 10A magnification of a fluidic device according to one embodiment of the present invention is illustrated wherein the struts are smooth. In FIG. 10B is a magnified view of the struts of the lattice of a fluidic device according to one embodiment of the present invention wherein the struts are rough.

Examples

Filtration: Filters can entrap impurities (either solid or liquid) by excluding impurities that are too large to fit through pores and pathways in the filter. Filters can also entrap impurities using surface effects and adhesion whereby impurities preferentially stick to the surfaces of the filter materials. In this instance, the frequency with which the impurities collide with the surface of the filter greatly influences the filtration efficiency. Lattices with offset struts can be used to promote turbulence and more frequent interaction between impurities and the surface of the filter. Used in conjunction with other lattices or with other structures, graded filtration may be achieved and exit flow may be controlled. Applications include water filtration, filtration of particulates entrained in hot gas streams (diesel particulate traps, for example), and filtration of molten metals. A uniform tapered fluid stream would provide an advantage for flowing molten metal into castings.

Static Mixers: Static mixers are used to intimately mix materials (usually fluids) by forcing the materials through a structure with tortuous pathways. Lattices with offset struts combined with other structures can be used to make very efficient static mixers. For example, a structure similar to the embodiment depicted in FIG. 9 could be used to mix epoxy in the turbulent regions and extrude a smooth uniform mixture through the tapered exit. The holes in the middle of the structure force any material traveling along the walls to be forced into the center of the structure.

Figure 11A:
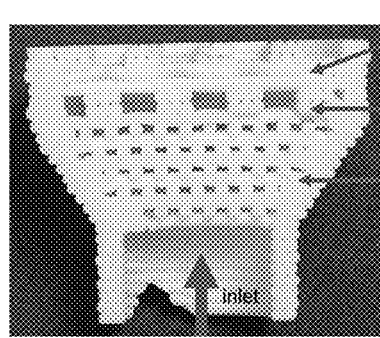
FIGS. 11A, 11B, 11C and 11D illustrate actual fluidic devices and a computer simulated fluidic device according to one embodiment of the present invention.
Figure 11C:
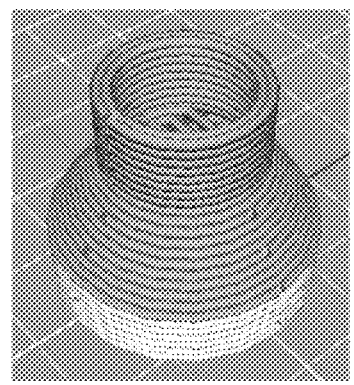
Figure 11B:
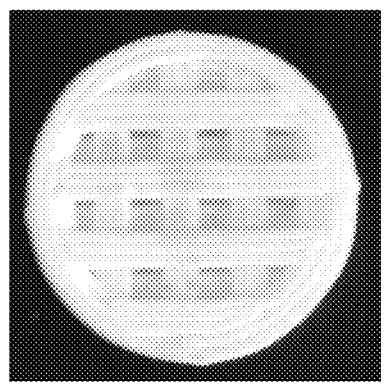
Figure 11D:
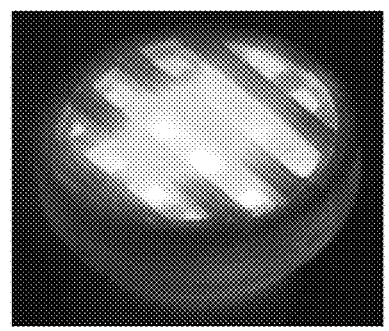

Radiant Burners: Ceramic foams and honeycombs have been utilized in radiant burners for some period of time but both are susceptible to uneven heating and flash back induced damage. The use of multiple lattices with offset struts can be used to create radiant burners with reduced likelihood of flashback and efficient transfer of energy from the combustion zone to struts which radiate heat. An example is shown in FIG. 11. Referring now to FIG. 11, various views of a monolithic radiant burner made by combining different lattices with offset struts is illustrated. In FIG. 11A, a cross-section of the fluidic device is presented. FIG. 11B illustrates a top view of the fluidic device presented in FIG. 11A. FIG. 11C illustrates a CAD model of the device in FIG. 11A (upside down orientation). FIG. 11D illustrates a view of the device in operation while burning a flowing combustible gas. A combustible gas flows from the inlet through the preheat lattice at high velocity. The velocity of the gas is reduced at the transition to the radiating lattice and traps the combustion front in this region. Because there is no vertical line-of-sight pathway from the combustion point through the radiating lattice there is efficient transfer of energy to the struts and they in turn radiate infrared heat. FIG. 11D shows the radiant burner in operation.

Catalyst Supports: When lattices with offset struts are used as catalyst supports it has been shown that mass transfer is increased and catalytic reactions can be completed more efficiently[4,5]. Lattices with offset struts used in conjunction with other lattices provide further optimization and control of reaction kinetics, resonance times, and thermal management for specific reactions confined within specific zones.

Exhaust Baffles: In exhaust systems, lattices with offset struts may be used in conjunction with other flow-control structures described above to reduce gaseous and particulate emissions while simultaneously suppressing noise.

Figure 12:
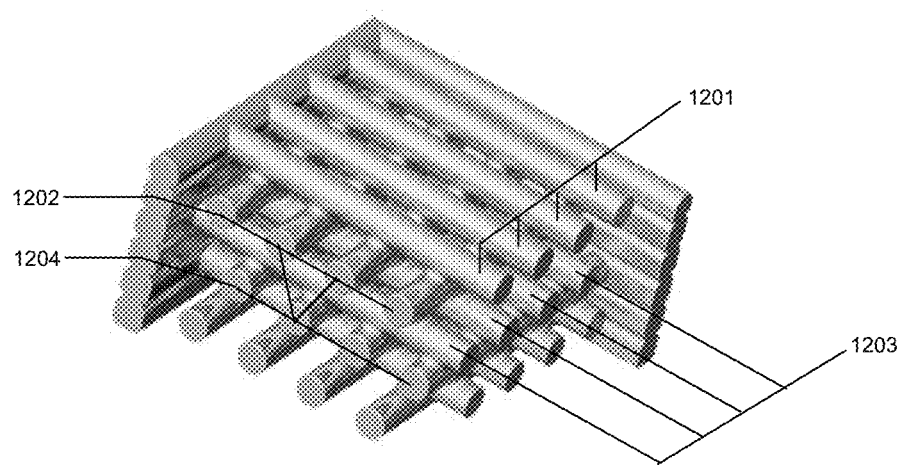
FIG. 12 illustrates a sectioned view of a lattice with offset struts.

Referring now to FIG. 12 a cut away of a region of a monolithic fluidic device lattice with offset struts is illustrated. This region can be used to induce enhanced tortuosity and turbulence to fluids or mixtures of fluids and solids as compared to a lattice with non-offset struts. An assemblage of periodic struts forms a top layer 1201. 1202 is a layer of periodic struts immediately below 1201 and oriented orthogonally to 1201. 1203 is a layer of periodic struts immediately below 1202 and oriented orthogonally to 1202. 1204 is a layer of periodic struts immediately below 1203 and oriented orthogonally to 1203. The struts in every other layer are oriented in the same direction but offset from each other. Layers 1202 and 1204 illustrate offset struts. The layer of periodic struts 1204 are offset with the layer of periodic struts 1202 meaning that from a top view the struts in 1204 are located in between the struts in 1202. Similarly, the struts in 1203 are offset from the struts in 1201.

Figure 13A:
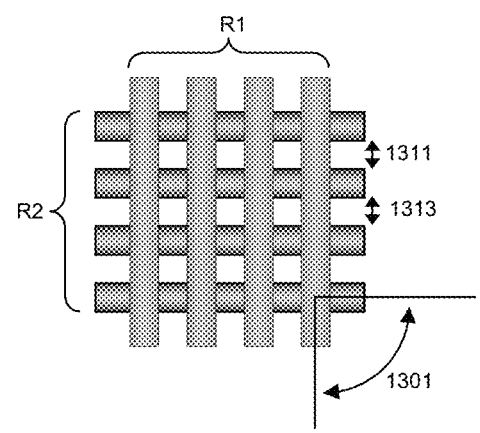
FIGS. 13A and 13B illustrate exemplary alignment of angles for a layer of struts.
Figure 13B:
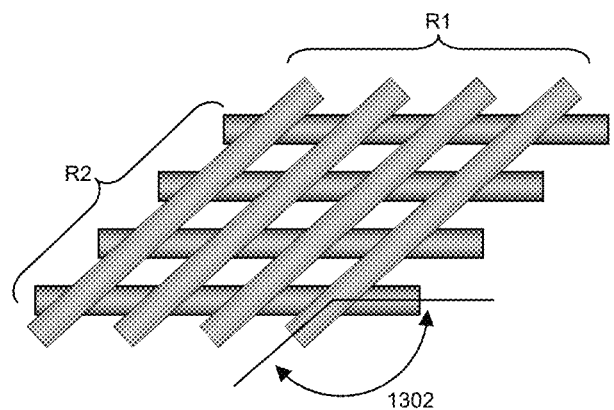

Referring now to FIG. 13 a top view of adjacent layers of struts may be oriented in any arbitrary direction. Referring to FIG. 13A, R1 is an assemblage of struts that comprise a top layer. R2 is an assemblage of struts that comprise a second layer directly below R1. The struts in R1 are oriented orthogonally to R2 with the angle of orientation 1301 being equal to about ninety (90) degrees. An example of this same orientation is shown in FIG. 5. Furthermore, the spacing between struts within layer R2 may have any arbitrary spacing 1311 and 1313 where 1311 does not have to equal 1313. Referring to panel B of FIG. 13, R1 is an assemblage of struts that comprise a top layer. R2 is an assemblage of struts that comprise a second layer directly below R1. The struts in R1 can be oriented in any arbitrary angle 1302 to the struts in R2.

The present invention has been described in terms of preferred embodiments, however, it will be appreciated that various modifications and improvements may be made to the described embodiments without departing from the scope of the invention. For example, a fluidic device can be produced having any geometric shape and is not limited to another columnar shape. Furthermore the devices may have more than two regions of varying structure. The entire disclosures of all references, applications, patents, and publications cited herein and/or in the attachments, and of the corresponding application(s), are hereby incorporated by reference.

REFERENCES

1) Smay, J. E., Tuttle, B. A., Cesarano III, J., Lewis, J. A., "Directed Colloidal Assembly of Linear and Annular PZT Arrays", Journal of the American Ceramic Society, 87(2), 293-295, 2004
2) Smay, J. E., Cesarano III; J., Lin, S. Y., Stuecker, J. N., Lewis, J. A., "Robocasting of photonic band gap structures", Solid Freeform Fabrication Symposium Proceedings, Austin, Tex., pp 175-178, 2001
3) Cesarano, et al; "Method for making a bio-compatible scaffold", U.S. Pat. No. 6,993,406, January 2006.
4) Stuecker, J. N., Cesarano III, J., Miller, J. E., Ferrizz, R. M., Mudd, J. E., Advanced Support Structures for Enhanced Catalytic Activity, Industrial and Engineering Chemistry Research, 43 [1] (2004) p. 51-55
5) Ferrizz, R. M., Stuecker, J. N., Cesarano III, J., Miller, J. E., Monolithic Supports with Unique Geometries and Enhanced Mass Transfer, Industrial and Engineering Chemistry Research, 44 [2] (2005) p. 302-308
6) John N. Stuecker, Joseph Cesarano III, James, E. Smay; "Robocasting Periodic Lattices For Advanced Filtration"; Solid Freeform Fabrication Proceedings, Austin, Tex., pp 561-566, 2001.
7) Smay, J. E., Cesarano III, J., Lewis, J. A., "Colloidal Inks for Directed Assembly of 3-D Periodic Structures", Langmuir, 18(14), 5429-37, 2002.
8) U.S. Pat. No. 6,027,326
9) U.S. Pat. No. 6,401,795

What is claimed is:

1. A method for making a three-dimensional porous fluidic device comprising:
depositing struts and or walls in the three-dimensional geometry using a rapid-prototyping method to construct a three-dimensional porous fluidic device the three-dimensional porous fluidic device comprising:
a fluidic inlet side and an outlet side;
a wall surrounding the fluidic device;
a first region within the wall of the fluidic device comprising a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed; and
a second region comprising one or more channels formed within the wall of the device wherein the second region is positioned at the fluidic inlet side, the fluidic outlet side or both,
wherein the second region contains a single channel formed by the wall of the device extending past the first region and wherein there are no struts positioned in the second region.

2. The method of claim 1 wherein the rapid prototyping method is a robocasting prototyping method wherein the deposit is slurry, inks, or pastes.

3. The method of claim 1 wherein a slurry contains a catalyst for reacting with matter to be passed through the fluidic device.

4. The method of claim 1 wherein the fluidic device is coated with a catalyst for facilitating a reaction within one or more fluids or a mixture of one or more fluids and a solid.

5. The method of claim 1 wherein the spacing between struts within a layer is uniform within a layer or varied.

6. The method of claim 1 wherein the slurry comprises a particles and a solvent wherein the particles are selected from a ceramic, a metal, a glass, a polymer, an organic or any combination thereof.

7. The method of claim 1 wherein the network has a periodicity.

8. A method for making a three-dimensional porous fluidic device comprising:
depositing struts and or walls in the three-dimensional geometry using a rapid-prototyping method to construct a three-dimensional porous fluidic device the three-dimensional porous fluidic device comprising:
a fluidic inlet side and an outlet side;
a wall surrounding the fluidic device;
a first region within the wall of the fluidic device comprising a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed; and
a second region comprising one or more channels formed within the wall of the device wherein the second region is positioned at the fluidic inlet side, the fluidic outlet side or both,
wherein the second region contains a plurality of channels formed from a plurality of layers of struts stacked in a row to form a plurality of walls such that the one or more channels are columnar and promotes a more laminar flow.

9. The method of claim 8 wherein the rapid prototyping method is a robocasting prototyping method wherein the deposit is slurry, inks, or pastes.

10. The method of claim 8 wherein a slurry contains a catalyst for reacting with matter to be passed through the fluidic device.

11. The method of claim 8 wherein the fluidic device is coated with a catalyst for facilitating a reaction within one or more fluids or a mixture of one or more fluids and a solid.

12. The method of claim 8 wherein the spacing between struts within a layer is uniform within a layer or varied.

13. The method of claim 8 wherein the slurry comprises a particles and a solvent wherein the particles are selected from a ceramic, a metal, a glass, a polymer, an organic or any combination thereof.

14. The method of claim 8 wherein the network has a periodicity.

15. A method for making a three-dimensional porous fluidic device comprising:
  depositing struts and or walls in the three-dimensional geometry using a rapid-prototyping method to construct a three-dimensional porous fluidic device the three-dimensional porous fluidic device comprising:
  a fluidic inlet side and an outlet side;
  a wall surrounding the fluidic device;
  a first region within the wall of the fluidic device comprising a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed; and
  a second region comprising one or more channels formed within the wall of the device wherein the second region is positioned at the fluidic inlet side, the fluidic outlet side or both,
  wherein the second region contains a plurality of channels formed from a plurality of layers of struts layered such that a first layer of struts is separated from a third layer of struts by a second layer of struts positioned at an angle to the first and third layer of struts and wherein the struts in the first layer and the second layer are aligned with respect to each other such that a columnar channel is formed to promote more laminar flow.

16. The method of claim 15 wherein the rapid prototyping method is a robocasting prototyping method wherein the deposit is slurry, inks, or pastes.

17. The method of claim 15 wherein a slurry contains a catalyst for reacting with matter to be passed through the fluidic device.

18. The method of claim 15 wherein the fluidic device is coated with a catalyst for facilitating a reaction within one or more fluids or a mixture of one or more fluids and a solid.

19. The method of claim 15 wherein the spacing between struts within a layer is uniform within a layer or varied.

20. The method of claim 15 wherein the slurry comprises a particles and a solvent wherein the particles are selected from a ceramic, a metal, a glass, a polymer, an organic or any combination thereof.

21. The method of claim 15 wherein the network has a periodicity.

* * * * *